United States Patent [19]

Hale, Jr.

[11] Patent Number: 4,667,936
[45] Date of Patent: May 26, 1987

[54] PIPE CUTTING APPARATUS

[75] Inventor: D. E. Hale, Jr., Parkersburg, W. Va.

[73] Assignee: Precision Piping & Instruments, Inc., Parkersburg, W. Va.

[21] Appl. No.: 782,562

[22] Filed: Oct. 1, 1985

[51] Int. Cl.[4] .............................................. B23K 7/10
[52] U.S. Cl. ........................................ 266/55; 266/77
[58] Field of Search ...................... 266/54, 55, 56, 76, 266/77; 219/68

[56] References Cited

U.S. PATENT DOCUMENTS

| 1,352,381 | 9/1920 | Reynolds | 266/55 |
| 1,692,924 | 11/1928 | Brown | 266/55 |
| 2,619,343 | 11/1952 | Guynn | 266/55 |
| 2,622,327 | 12/1952 | Halonen | 266/55 |
| 3,514,086 | 5/1970 | Clanin | 266/55 |
| 3,711,076 | 1/1973 | Goetz | 266/55 |
| 4,162,383 | 7/1979 | Hamasaki | 266/55 |

FOREIGN PATENT DOCUMENTS 0814617 3/1981 U.S.S.R. .............................. 266/55

Primary Examiner—L. Dewayne Rutledge
Assistant Examiner—S. Kastler
Attorney, Agent, or Firm—Stevens, Davis, Miller & Mosher

[57] ABSTRACT

This invention relates to a pipe cutting apparatus for cutting large diameter pipe. The apparatus is provided with a cutting means which can be angled for cutting miters. The cutting means can be a torch. The apparatus has a flexible drive mechanism which adjusts for variations in cutting angle. Torque is communicated to the cutting means by a motor via clutch means.

28 Claims, 4 Drawing Figures

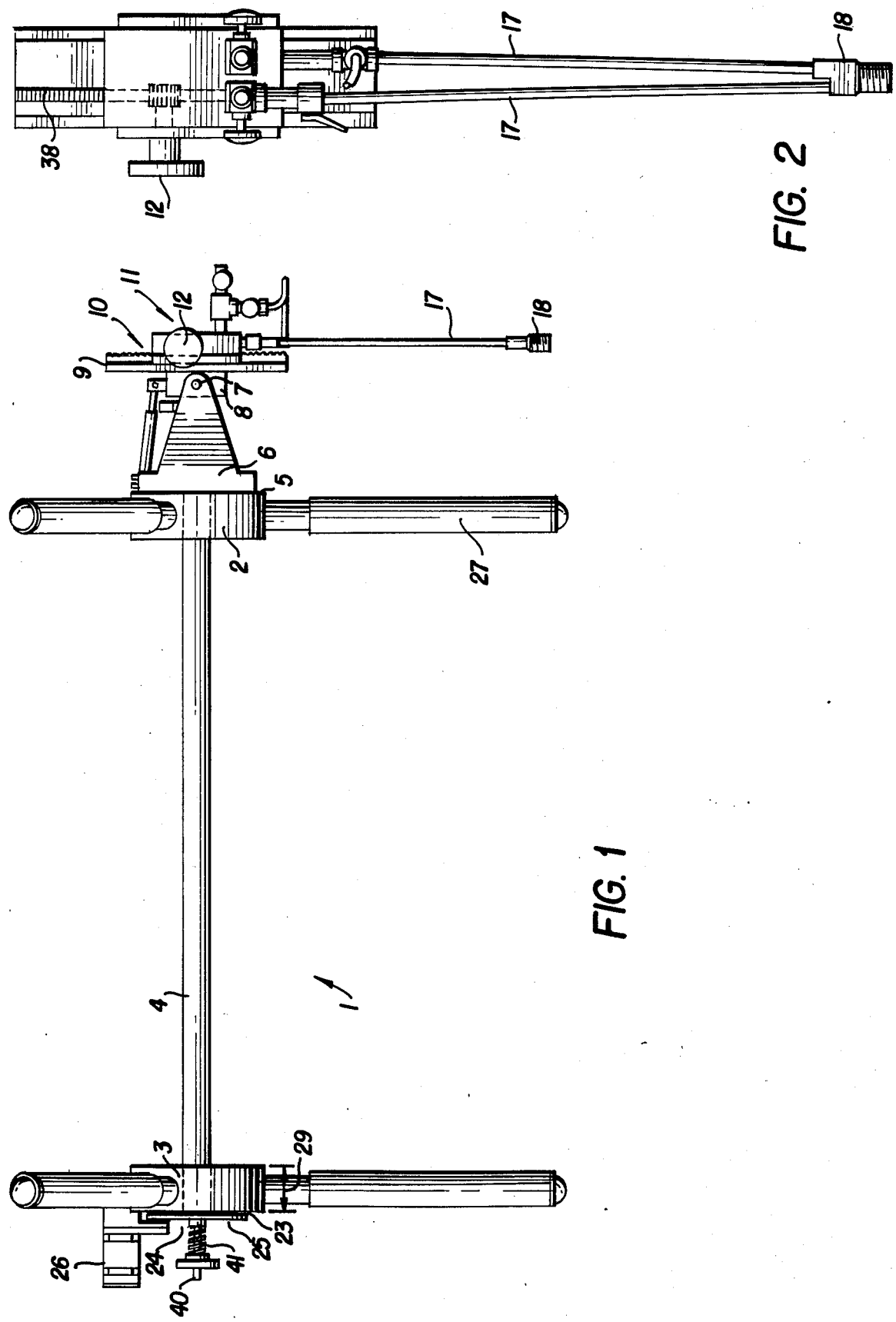

PIPE CUTTING APPARATUS

BACKGROUND OF THE INVENTION

1. Field of the Invention

This invention relates to an apparatus for cutting large diameter pipes.

2. Description of the Prior Art

There are devices available that can cut large diameter pipe while positioned within the inside of such a pipe. However, these devices ae cumbersome and difficult to use, if not impossible to use, on spiral pipes or to make miter cuts.

U.S. Pat. No. 3,711,076 to Goetz discloses a pipe cutting machine mounted within the inside diameter of a pipe and designed to make straight cuts rather than miter cuts. The device includes a single hub to which is attached a plurality of adjusting arms for mounting the device within the pipe. A drive unit is rotatably mounted on the axis of the hub and is driven by a motor. A support unit for a cutting torch is mounted on the same axis as the drive unit, but is positioned on the opposite side of the hub with respect to the drive unit. The cutting torch includes a removable cutting torch head having a rack for adjusting the torch cutting head in relation to its distance from the wall of the pipe. The apparatus disclosed by Goetz is positioned within the pipe by adjusting telescoping legs. Such a requirement presents set-up problems, for instance, the apparatus is not self-centering. Thus, it leads to inaccuracies in alignment of the torch cutting head relative to the inside surface of large diameter pipe. The apparatus also suffers from the disadvantage that an operator must manually change the radial position of the torch head during the cutting operation if the inside diameter of the pipe is irregular. When an operator is distracted, the revolving torch may hit the inside diameter of the pipe, jamming the cutting head, or worse, damaging it. The cutter is also prone to inaccuracy when cutting pipe.

U.S. Pat. No. 2,622,327 to Halonen also relates to a rotating torch cutting apparatus for large diameter pipe. This device includes a base member having longitudinally spaced supports, wherein one of the supports rotates with the base member while the second support remains stationary. The base member has telescoping legs for supporting the device within large diameter pipe. However, the disadvantage of this device is that cables are used to control the angle of cut of the cutting assembly or cutting head and an additional cable is used to return the cutting head to an initial position. Such cables complicate operation of the device and require an operator to ensure that the cables are not tangled within the rotating mechanism. Additionally, although the cutting head can make a cut of 360°, the head cannot continue cutting in the same direction as the previous cut until the head is rewound to its starting position. These advantages result in a device that is imprecise, that cuts miters in a manner different from the present invention and has difficulty in cutting spiral pipe.

The present invention is directed to a pipe cutter which overcomes disadvantges of the prior art. It precisely cuts miters in a continuous manner, regardless of the type of pipe being cut. The present device is self-centering and has a minimum of moving parts. These features make this invention distinctive and novel over prior art pipe cutters.

OBJECTS OF THE INVENTION

An object of this invention is to provide a selfcentering apparatus for cutting large diameter pipe for conventional pipe material.

Another object of the invention is to provide such a cutting apparatus that automatically adjusts the angle of the torch head relative to its drive mechanism.

Another object of the invention is to provide a pipe cutter with clutch and drive means that rotate the torch cutting head to provide a smooth, even cut to large diameter pipe, regardless of cutting angle, without fear of damaging the torch.

These objects and other objects of the invention can be understood by the following description.

SUMMARY OF THE INVENTION

The improved pipe cutting apparatus of this invention is characterized by its simplicity of moving parts and operation, permitting a self-centering feature which promotes improved accuracy while cutting miters from different types of pipe, including large diameter spiral pipe.

The invention is further characterized by the following:

A pipe cutting apparatus for cutting pipe from within the pipe, comprising:

first and second support discs supporting a continuous rotatable rod;

a cutting means connected at one end of said rotatable rod;

a drive means mounted on said second disc; and a clutch means mounted on a second end of said rotatable rod for transmitting torque from said drive means to said rotatable rod for rotating said cutting means.

A pipe cutting apparatus for cutting pipe from within the pipe, comprising:

first and second support discs having short widths which support a continuous rotatable rod;

a cutting means connected at one end of said rotatable rod;

a drive means mounted on said second disc; and means connected to said first disc for changing the cutting angle of said cutting means.

A pipe cutting apparatus for cutting pipe within the pipe comprising:

first and second support discs supporting a continuous rotatable rod;

a cutting means connected at one end of said rotatable rod;

a drive means mounted on said second disc;

a clutch means mounted on a second end of said rotatable rod for transmiting torque from said drive means to said rotatable rod for rotating said cutting means; and means for changing the cutting angle of said cutting means.

A pipe cutting apparatus for cutting large diameter pipe from within the pipe, comprising:

a torch head mounted on a rack support, said torch head connected to a first rotatable rod, first and second cylindrical disc supports having short widths through which a second rotatable rod is axially positioned, and said second rotatable rod at a first end is connected to said first rotatable rod by a connecting rod, thus forming a continuous rotatable flexible rod;

drive means supported by said second disc;

clutch means mounted on said second rotatable rod for transmitting torque from said drive means to said second rotatable rod, said second rotatable rod transmits torque to said rod connecting rod, which transmits torque to said first rotatable rod to rotate said torch head;

a piston cylinder for adjusting the cutting angle of said torch head relative to said first disc, said piston cylinder connected at a first end to said first disc and at its opposing end to a central support rotatably connected to first and second support plates attached to said first disc, and said first rotatable rod extends longitudinally through said central support;

said first end of said second rotatable rod has telescoping means for shortening said first end, as said piston cylinder, starting from a fully retracted position, is extended to change the cutting angle of said torch head relative to said first disc.

BRIEF DESCRIPTION OF THE DRAWINGS

Further details are explained by way of the attached drawings and the following description, which are not considered to limit the invention:

FIG. 1 is a plan view of the cutting apparatus of this invention having drive and clutch means connected to a flexible drive train;

FIG. 2 is a front view of the apparatus of FIG. 1 showing the rack and torch head;

DESCRIPTION OF THE INVENTION

Figure 3:
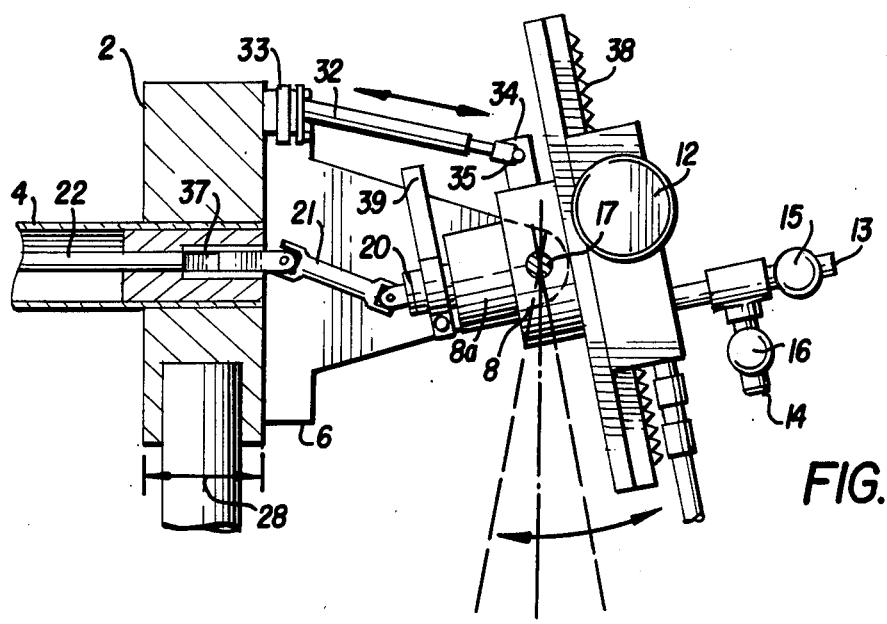
FIG. 3 is a magnified view, part in section showing the flexible drive chain mechanism, rod, rack and torch head of the invention.

FIG. 1 shows the improved pipe cutting apparatus of this invention. The apparatus is capable of making straight cuts in large diameter metal pipe or large diameter spiral pipe.

The apparatus of this invention is also capable of making an accurate miter cut. For purposes of this invention, a miter cut is defined as an angled cut, that is, a cut which is made by a torch cutting head positioned at an angle other than perpendicular to the inner surface of a pipe.

The apparatus comprises a torch head, drive mechanism for rotating the torch head, and discs for supporting the drive mechanism. The structure of the discs is conventional and not critical.

The torch head 11 consists of a rack 10 and a rack mount 9, oxygen and acetylene delivery means 13-16, torch tubes 17 for delivering combustible gases to a torch tip 19, torch tip mounting bracket 18 and torch tip 19. The torch head is connected to a first rotatable rod section 20, which passes axially through a central support 8. Rotatable rod section 20 is connected to a connecting rod 21, and connecting rod 21 is connected to a second rotatable rod section 22. Rotatable rod section 22 is positioned within a center tube 4, and center tube 4 is supported by discs 2 and 3. Mounted to the short widths or thickness 28 and 29 of discs 2 and 3 are telescoping legs 27, which are disposed at essentially equal angles in relation to one another. A drive means 26 is mounted on hub 3. Torque is transmitted from the drive means 26 by way of conventional friction clutch means 24 to the second rotatable rod 22 which transmits torque to the connecting rod 21, which in turn transmits torque to the first rotatable rod 20 which rotates the cutting head "a full 360°". The cutting head 11 is also free to complete a second or continuous revolution without the necessity of having to be returned to an initial or rest position. In this manner, with the apparatus operable, a cut from the inside surface of the pipe can be made. This can be a conventional straight cut or a miter cut. Miter cuts can be made by angling the torch head relative to the short axis or inside surface of the pipe. A piston cylinder attached to the first disc 2 and connected to the central support 8 allows for cutting angle adjustment. Extending the piston of the piston cylinder causes the torch head to change its cutting angle relative to the first disc support. Moving the torch head in this manner repositions the torch tip near the inside surface of the pipe at a cutting angle with respect to the inside surface of a pipe, thus making it possible for the apparatus to make a miter cut.

FIG. 1 further shows a center tube 4 supported by two opposing discs 2, 3. The center tube extends through the center of each disc 2, 3 and separates the discs by a distance of preferably about 30 to 44 inches. Supported on the outside face 5 of disc 2 are two support plates 6 (only one shown). The rear width of these plates are flush with the outside face 5 of disc 2. The opposing ends of the plates are curved and have an eye at the center of their curve. Shafts 7 (only one shown), mounted on opposing sides of a central support 8, have an outside diameter slightly smaller than the inside diameter of the eyes of the plates 6. The opposing ends of the support plates are mounted to central support 8 by way of shafts 7. Central support 8 is therefore rotatable relative to the support plates 6. Positioned on the front of the central support 8 is a rack mount 9, which holds the rack 10 and the torch head 11 of the invention.

The torch head 11 comprises the rack 10, an adjustment knob 12 for the rack, oxygen and acetylene inlet means 13 and 14 having hoses and valves 15 and 16, respectively, torch tubes 17, a torch tip mounting bracket 18 connected to the torch tubes and, mounted thereon, is torch tip 19. The torch tubes 17 can be disconnected and exchanged for smaller or larger tubes, depending on the diameter of the pipe to be cut. The torch tip 19 can be replaced with a spring-loaded marker (not shown), which can mark cuts on materials that cannot be cut with an acetylene torch. The torch tubes themselves can be spring loaded for adjusting their length. It is also envisioned that the torch tip could be exchanged with a scoring implement which could cut glass tubes, or a rotating abrasive blade to cut cement or tile tubes.

The rack 10, the oxygen and acetylene inlet means, the torch tube and torch tips are constructed so that hollow means exist therein and communicate with each other, whereby a fluid, such as oxygen or acetylene, can pass from a source of such fluid to the torch tips. Hoses connect the inlet means to such a source. To prevent the hoses from being wound around the torch cutting head, the hose connections are provided with conventional swivel connecting means, joining the hoses to the cutting head.

Referring to FIG. 3, a rotatable rod section 20 extends longitudinally through the central support 8 and is rotatable within the central support. Rotatable rod section 20 is connected to the torch head 11 and, when torque is transmitted to rotatable rod section 20, the torch head 11 is rotated. Rotatable rod section 20 is connected to a connecting rod 21, which in turn is connected to a second rotatable rod section 22. Rods 20, 21 and 22 form a continuous flexible drive train which provides automatic adjustment in the length of the drive train relative to the angled position of the torch. Rotatable rod section 22 is positioned within and extends in either direction beyond the length of the center tube 4. Rod 22 is rotatable within the central tube 4. On the outer face 23 of disc 3, as shown in FIG. 1, connected to rotatable rod section 22, is a conventional friction clutch assembly. Drive means 26 is mounted to disc 3. The clutch, when engaged, transmits torque from the drive means 26 to rotatable rod section 22 by way of drive gear 25. Rotatable rod section 22 then transmits torque to connecting rod 21, which in turn transmits torque to rotatable rod section 20 which rotates torch head 11. If the apparatus has been positioned within a pipe having an irregular inside diameter, there is a chance that the torch tip could become jammed against the pipe surface as it rotates. To prevent damage to the torch tip, a friction clutch means 24 is provided, causing the drive means to free wheel, thus preventing rotation of the torch head.

Clutch means 24 consists of an adjustment knob 40, a spring 41, a drive gear 25, and conventional friction pads (not shown) and a clip ring (not shown). The clip ring is attached to rod 22. Located on rod 22, just behind and attached to the clip ring, is a metal friction disc. Behind the metal friction disc is a friction pad which is connected to drive gear 25, and behind the drive gear 25 is spring 41. Turning adjustment knob 40 in the clockwise direction causes the spring to apply an increased force against the drive gear, which causes the drive gear and the friction pad to become frictionally connected to the metal friction disc. When the drive means 26 is activated, the drive gear 25 rotates, thus rotating the torch head 11. If the torch tip becomes jammed against the inside surface of a pipe, the frictional force between the friction pad and the metal friction disc is overcome, thus causing the gear to freewheel stopping the rotation of cutting head 11. The sensitivity of the clutch is controlled by the tension adjustment knob 40. The frictional force applied by the spring to the gear can be increased by turning the adjustment knob 40 in the clockwise direction and decreased by turning the adjustment knob in the counterclockwise direction.

Figure 4:
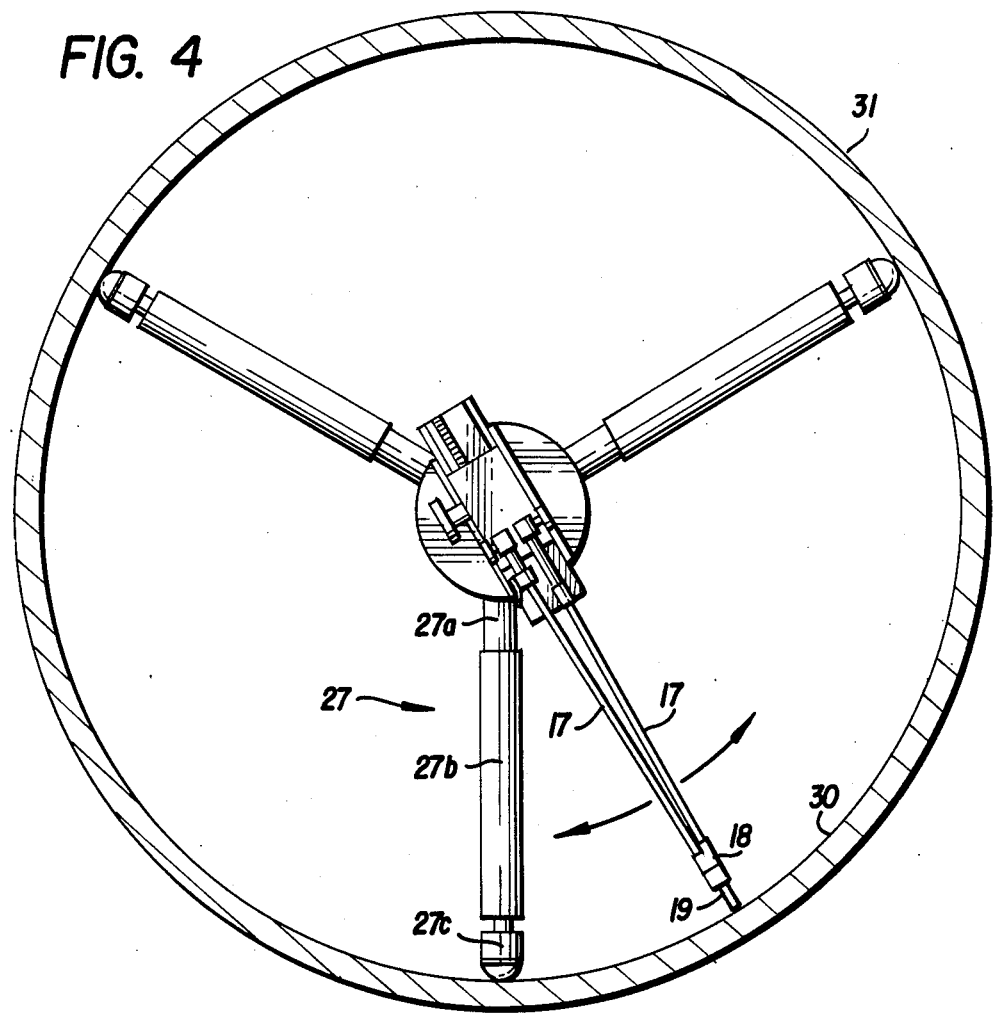
FIG. 4 is a front view of the apparatus of the invention positioned within a pipe.

Preferably, two sets of three telescoping legs 27, disposed at 120° angles in relation to each other, are journaled to the short widths or thicknesses 28 and 29 of discs 2 and 3. The legs, as shown in FIG. 4, include sections 27a, 27b, 27c. Leg extension 27b, having an inner diameter larger than the outer diameter of extension 27a, fits over extension 27a. The sections can be pinned to each other to lock 27a and 27b together. Knobs 27c, on the ends of 27b, engage the inside wall of the pipe. Thus, the legs telescope in a conventional, measured manner. The length of the legs could also be adjusted by means of a spring loaded mechanism. By extending the legs, pipe having diameters of 70 inches can be cut. The apparatus can also be modified to cut greater diameter pipe. The smallest diameter pipe which can be cut is only limited by the size of the cutting head, torch tubes and support discs. To place the apparatus within a pipe, the two top legs (one each on opposing hubs) are preset to a length 2 inches less than the pipe radius, while the remaining legs are set to a length equal to the pipe radius. The apparatus is then placed within the pipe. The ends of the two top unsupporting legs are then turned out to meet the inside wall of the pipe and are pinned, locking the apparatus in position. In this manner, the apparatus is self-centering.

Having locked the apparatus in place, the torch tip 19 can then be adjusted and aligned with the inside face 30 of the large pipe 31. Alignment is accomplished by means of piston cylinder 32 and by rack 10. The piston cylinder 32, preferably made of brass, adjusts the angle or miter of the pipe to be cut, while the torch tip 19 can be extended very close to the inner face 30 of the pipe 31 or retracted away from the inner face by adjusting the rack knob 12.

FIG. 3 best shows the means for positioning the torch tip. Piston cylinder 32 is fixed to the outside face of disc 2 by means of a ball and socket connection 33. The opposing end of the piston cylinder 32 is affixed to a flange 34 on central support 8 by means of a cotter pin connection 35. Flange 34 is positioned on the top of central support 8 and is perpendicular relative to shafts 7. Extension of the piston of piston cylinder 32 will bring the torch head 11 from an obtuse angle alpha with respect to the bottom of disc 2 into parallel position therewith, and a further extension of the rod will rotate the torch head so that an acute angle beta is formed between the torch head and the bottom of disc 2. Shafts 7 may be threaded and extend beyond the eyes of the support plates 6. A wing nut may be screwed onto the threaded shaft to secure the cutting head at a particular angle through friction. The angle of the torch head can be changed by loosening the nut and repositioning the head and then once again securing the nut. Other friction devices within the skill of those in the art can also be used to change the position of the torch head. As can be seen from FIG. 3, connecting rod 21 allows the drive train to flex as the angle of the cutting torch is moved from the acute angle through the parallel angle to the obtuse angle, relative to the bottom face of disc 2, by extension of the piston of piston cylinder 32. Connecting rod 21 and rods 20 and 22 are provided with connecting means 36 and 36a at their ends, which permit the connecting rod to receive torque from rotatable rod section 22 and communicate torque to rod 20, regardless of the angle the connecting rod is positioned in. Connecting means may include a swivel pin-type structure, a universal coupling or a ball joint connection. The connecting means, however, must impart a degree of flexibility to the drive mechanism at the rod connection to compensate for variation in the distance between the torch head 11 or central support 8 and center tube 4 or disc 2. The end of rotatable rod section 22, connected to the connecting rod 21, sits within and extends beyond sleeve 37 and is telescoping. As the angle of the cutting torch head is changed, the drive mechanism must be prevented from jamming and thus locking up. Jamming is prevented by the flexibility imparted to the drive mechanism via the connecting rod and the telescoping end of rotatable rod section 22. As the rod of piston cylinder 32 is extended from its retracted position, the torch head is moved through the obtuse angle alpha to the parallel angle. As the torch head goes through this motion, the drive mechanism at the connecting joint must flex, thus moving the end of connecting rod 21 connected to the first rotatable rod section 20 from a position downward of the second rotatable rod 22 to a position of axial alignment therewith. At the same time, the telescoping end of rod 22 permits for simultaneous shortening of the drive mechanism. As the angle of the torch head changes from the parallel angle to an acute angle beta relative to the base of disc 2, the distance between the torch head 11 or central support rod 8 and center tube 4 or discs 2 changes, while the connected end 36a of the first rotatable rod is moved from a position of axial alignment relative to the second rotatable rod to a position upward thereto. Of course, it is envisioned that the connecting rod or even the first rotatable rod could be telescoping.

The torch head 11 can be moved closer to the inner pipe face 30 by turning knob 20 of the rack in the clockwise direction, which causes the cutter head to traverse the teeth 38 of the rack 10. Of course, counterclockwise turning of knob 12 will cause the torch tip to be retracted from the inner face of the pipe.

On actuating the drive motor 26 on disc 3 and engaging the clutch, torque is communicated from the drive mechanism to the torch head through gear means 25. The motor 26 is preferably a variable speed reversible motor. The torch head can rotate a full 360° without obstruction. The torch head can be continually rotated in one direction or in the reverse direction by causing the drive mechanism to move in the reverse direction. A control box (not shown) can be electrically connected to the drive mechanism so that it can be remotely controlled in a conventional manner. When oxygen and acetylene are supplied to the torch tip 19 through torch tubes 17, the torch tip is capable of supporting a cutting flame. The rotation of the torch head will cut the pipe as the tip moves circumferentially about the inner face of the pipe. The point on the pipe wall to which the torch tip is directed is heated first by an acetylene-supported flame, but not cut. A fine stream of oxygne is then delivered to the torch tip from an oxygen supply via rack and torch tubes to cut the pipe. The pipe torched by the stream of oxygen burns through, leaving a clean cut edge. When the torch tip is perpendicular to the inner surface of the pipe, a conventional straight cut is made. However, by extending or retracting piston cylinder 32, the torch head can be moved from a position parallel to hub 2 to an angle relative thereto. In this position, the torch tip is angled relative to the pipe's inner surface and, as the tip moves circumferentially about the inner surface of the pipe, a miter cut or angled cut can be made, as described above.

Because of a small amount of play present in the drive mechanism, the torch has a tendency to jump when rotated past top center. A friction brake means 39, prevents the torch from jumping providing an even torque during the rotation of the torch head 11, by imparting a small drag against the drive mechanism. The friction brake has a tail end and curved clamping members at its opposing end. The curved members form an almost complete circle which define a bore. The bore is slipped over rotatable rod 22. The ends of the clamping members are joined by a tension screw and tightening the screw causes the clamping members to frictionally grip rod 22. When drive is imparted to rod 22, the tail end of the brake rotates and strikes either one of the two support plates 6 depending on the direction of the drive. The friction brake is prevented from rotating further, but rod 22 is caused to frictionally rotate within the clamping member, thus imparting a slight drag to the drive train. The drag can be increased or decreased by respectively tightening or loosening the screw.

The apparatus of this invention can cut pipe of various material. Such material includes glass, plastic, paperboard and sheet metal.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended thereto.

I claim:

1. A pipe cutting apparatus for cutting pipe from within the pipe, comprising:
   a first rotatable rod;
   first and second support discs having short widths supporting a second rotatable rod, said first disc being spatially closer to said cutting means than said second disc;
   a cutting means connected at one end of said first rotatable rod;
   a connecting rod for connecting said first and second rotatable rods, said connecting rod having connecting means for positioning said first and second rotatable rods at different angles relative to each other;
   a drive means mounted on said second disc; and
   means for changing the cutting angle of said cutting means.

2. The pipe cutting apparatus of claim 1, further comprising telescoping legs journaled to the short widths of said discs.

3. The pipe cutting apparatus as recited in claim 1, whereby torque produced by said drive means, rotating said torch head, is kept constant by a friction brake means mounted on said rotatable rod.

4. The pipe cutting apparatus recited in claim 1, further comprising a central support, wherein said first rotatable rod passes axially through said central support and is attached to said cutting means.

5. The pipe cutting apparatus recited in claim 4, wherein said means for changing the cutting angle of said cutting means comprises a piston cylinder attached to said first disc and functionally attached to said cutting means.

6. The pipe cutting apparatus recited in claim 5, wherein said piston cylinder is attached to said central support and said first disc.

7. The pipe cutting apparatus recited in claim 1, wherein said drive means is automatically controlled.

8. The pipe cutting apparatus recited in claim 2, wherein at least two telescoping legs are journaled to each of said short widths.

9. The pipe cutting apparatus recited in claim 2, wherein three telescoping legs are journaled to each of said short widths.

10. A pipe cutting apparatus for cutting round pipe from within the pipe, comprising:
    a first rotatable rod;
    first and second support discs having short widths supporting a second rotatable rod, said first disc being spatially closer to said cutting means than said second disc;
    a metal cutting means for round pipe connected at one end of said first rotatable rod;
    a connecting rod for connecting said first and second rotatable rods, said connecting rod having connecting means for positioning said first and second rotatable rods at different angles relative to each other;
    a drive means mounted on said second disc; and
    means for changing the cutting angle of said cutting means.

11. The pipe cutting apparatus recited in claim 1, wherein said cutting means is a torch.

12. The pipe cutting apparatus recited in claim 6, wherein said means for changing the cutting angle further comprises a support plate, said first disc being attached to said support plate and said central support being rotatably attached to said support plate.

13. The pipe cutting apparatus recited in claim 4, wherein said cutting means further comprises means for adjusting the cutting means whereby the cutting means is extended close to an inside surface of the pipe.

14. The pipe cutting apparatus recited in claim 13, wherein said means for adjusting comprises rack and teeth means.

15. The pipe cutting apparatus recited in claim 1, wherein said cutting means comprises a torch head, at least one torch tube and a torch tip.

16. The pipe cutting apparatus recited in claim 15, wherein said torch tube can be exchanged for a tube of different length.

17. The pipe cutting apparatus recited in claim 14, wherein said means for adjusting further comprises an adjustment knob attached to said rack and teeth means, said rack and teeth means being supported on a rack mount, said rack mount positioned on said central support.

18. The pipe cutting apparatus recited in claim 1, further comprising a clutch means mounted on a second end of said rotatable rod for transmitting torque from said drive means to said rotatable rod for rotating said cutting means.

19. The pipe cutting apparatus recited in claim 18, further comprising a friction brake connected to said rotatable rod to provide a continuous torque to said cutting means.

20. The pipe cutting apparatus recited in claim 1, wherein said means for changing the cutting angle is a means for changing the cutting angle to make a miter cut.

21. The pipe cutting apparatus recited in claim 1, wherein said connecting means of said connecting rod is a universal joint.

22. The pipe cutting apparatus recited in claim 1, wherein said connecting means of said connecting rod is a ball joint.

23. A pipe cutting apparatus for cutting pipe from within the pipe, comprising:
- a torch head mounted on a rack support, said torch head connected to a first rotatable rod, first and second cylindrical disc supports having short widths through which a second rotatable rod is axially positioned, and said second rotatable rod at a first end is connected to said first rotatable rod by a connecting rod, thus forming a continuous rotatble flexible rod;
- drive means supported by said second disc;
- clutch means mounted on said second rotatble rod for transmitting torque from said drive means to said second rotatable rod, said second rotatable rod transmits torque to said rod connector, which transmits torque to said first rotatable rod to rotate said torch head;
- a piston cylinder for adjusting the cutting angle of said torch head relative to said first disc, said cylinder rod connected at a first end to said first disc and at its opposing end to a central support rotatably connected to first and second support plates attached to said first disc, and said first rotatable rod extends longitudinally through said central support;
- said first end of said second rotatable rod has telescoping means for shortening said first end as said piston cylinder, starting from a fully retracted position, is extended to change the cutting angle of said torch head relative to said first disc.

24. The apparatus as recited in claim 23, further comprising telescoping legs, journaled to the short widths of said cylindrical discs.

25. The apparatus as recited in claim 24, wherein at least two telescoping legs are journaled to each of said short widths.

26. The apparatus as recited in claim 24, wherein three telescoping legs are journaled to each of said short widths.

27. A round pipe cutting apparatus for cutting metal pipe from within the pipe, comprising:
- a torch head mounted on a rack support, said torch head connected to a first rotatable rod, first and second cylindrical disc supports having short widths through which a second rotatable rod is axially positioned, and said second rotatable rod at a first end is connected to said first rotatable rod by a connecting rod, thus forming a continuous rotatable flexible rod;
- drive means supported by said second disc;
- clutch means mounted on said second rotatable rod for transmitting torque from said drive means to said second rotatable rod, said second rotatable rod transmits torque to said rod connector, which transmits torque to said first rotatable rod to rotate said torch head;
- a piston cylinder for adjusting the cutting angle of said torch head relative to said first disc, said cylinder rod connected at a first end to said first disc and at its opposing end to a central support rotatably connected to first and second support plates attached to said first disc, and said first rotatable rod extends longitudinally through said central support;
- said first end of said second rotatable rod has telescoping means for shortening said first end as said piston cylinder, starting from a fully retracted position, is extended to change the cutting angle of said torch head relative to said first disc.

28. The apparatus as recited in claim 23, further comprising a friction brake connected to said first rotatable rod to provide a continuous torque to said cutting means.

* * * * *